Aug. 10, 1971　　　R. H. FRYKHULT ET AL　　　3,598,731

MULTIPLE HYDROCYCLONE

Filed Nov. 20, 1969　　　　　　　　　　　　　5 Sheets-Sheet 1

INVENTORS
RUNE HELMER FRYKHULT
KARL FOLKE OLOF JAKOBSSON
BY

Davis, Hoxie, Faithfull & Hapgood
ATTORNEYS

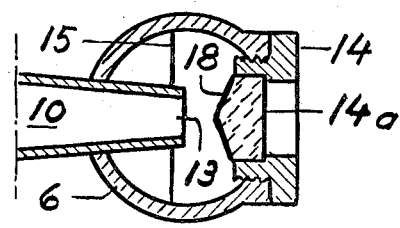
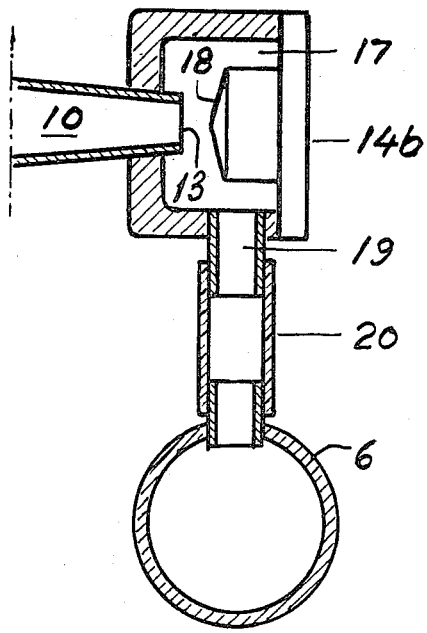
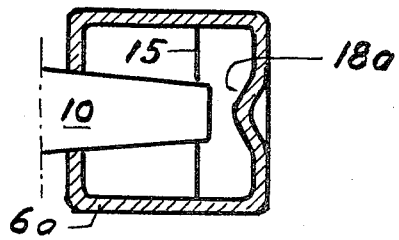
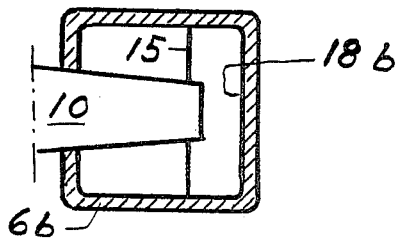
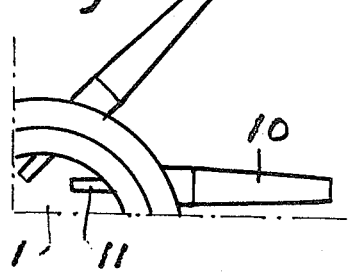
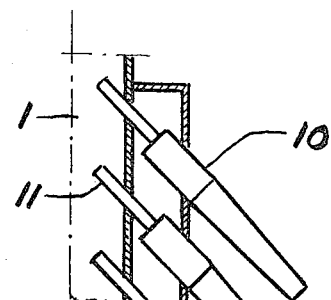

Aug. 10, 1971 R. H. FRYKHULT ET AL 3,598,731
MULTIPLE HYDROCYCLONE
Filed Nov. 20, 1969 5 Sheets-Sheet 3
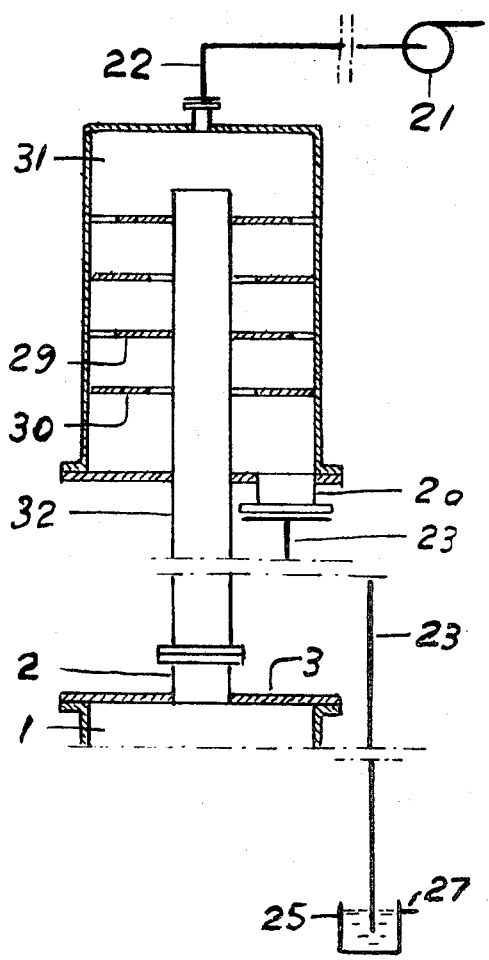
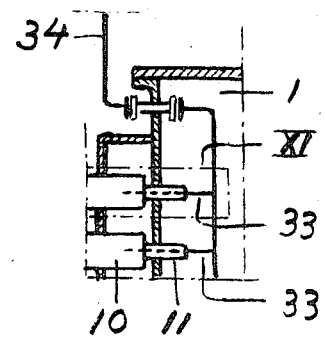
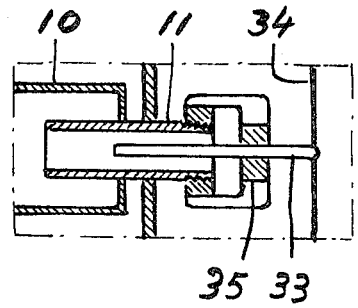
INVENTORS
RUNE HELMER FRYKHULT
KARL FOLKE OLOF JAKOBSSON
BY
Davis, Hoxie, Faithfull + Haygood
ATTORNEYS United States Patent Office 3,598,731
Patented Aug. 10, 1971

3,598,731
MULTIPLE HYDROCYCLONE
Rune Helmer Frykhult, Johanneshov, and Karl Folke Olof Jakobsson, Taby, Sweden, assignors to Aktiebolaget Celleco, Tumba, Sweden
Filed Nov. 20, 1969, Ser. No. 878,295
Claims priority, application Sweden, Nov. 20, 1968, 15,742/68; Sept. 8, 1969, 12,350/69
Int. Cl. B04c 5/28
U.S. Cl. 210—94
18 Claims

ABSTRACT OF THE DISCLOSURE

A central vessel is surrounded by groups of hydrocyclones arranged one above another, each hydrocyclone forming an elongated vortex chamber having an accept end provided with an inject inlet and an axial accept outlet, each chamber also having an opposed reject end provided with an axial reject outlet. The central vessel forms an accept chamber common to and communicating with the vortex chambers by way of their accept outlets. Means are provided at the reject ends of the vortex chambers for collecting the reject from the reject outlets, the collecting means including means in the vicinity of the reject outlets for enabling detection of a change in the reject flow.

---

This invention relates to multiple hydrocyclones of the type having a great number of hydrocyclones each forming an elongated vortex chamber having an accept end provided with an inject inlet and an accept outlet and also having an opposed reject end provided with an axial reject outlet, the vortex chambers being arranged in groups one above the other and distributed around a central vessel with which the vortex chambers communicate.

Multiple hydrocyclones of the above-described type are known in the art, an example being disclosed in Swedish Pat. No. 181,191. According to this patent, the vortex chambers are conical and narrow toward their reject ends, and these chambers are arranged horizontally with their reject outlets turned toward and projecting radially into the central vessel, which forms a reject chamber common to the vortex chambers. Surrounding the accept ends of the vortex chambers is a vessel of annular cross-section which is concentric to the reject chamber and into which the accept outlets of the vortex chambers project. This vessel constitutes an accept chamber common to the vortex chambers. The inject or feed is brought in the inject inlets of the different vortex chambers either by connecting each of these chambers with a complicated system of pipes for the injection or by enclosing the vortex chambers in a vessel which fills the entire space between the reject and accept chambers and constitutes a common injection chamber for the vortex chambers.

The multiple hydrocyclone according to the previously mentioned Swedish patent usually works under over-pressure or vacuum in the reject chamber as well as in the accept chamber, so that both chambers must be constituted by closed pressure vessels. Such a vessel with a large diameter and a large wall area is expensive to produce. Moreover, the reject outlet must be enclosed and can neither be observed during operation nor cleaned without long interruptions in the operation. In such a multiple hydrocyclone, a large part of the pulp suspension flows unchanged through the multiple hydrocyclone, if a number of reject outlets are blocked or clogged. In the latter case, difficulties are encountered in a later stage when the fault appears in the product.

An object of the present invention is to solve the problem of determining whether and where a stoppage of a reject outlet has occurred during operation of a multiple hydrocyclone.

In the multiple hydrocyclone of the present invention, the vortex chambers communicate with the central vessel through the accept outlets, and this vessel constitutes an accept chamber which is common to the vortex chambers. Means are arranged at the reject ends of the vortex chambers for collecting the reject flowing through the reject oulets, the collecting means including means enabling a sensing or detection of a change in the reject flow.

The above-mentioned detection or sensing means may comprise a transparent section or other device for optical sensing, or it may comprise a flow meter or any mechanical or electrical means for sensing a change in the reject flow.

The above-mentioned means for collecting the reject may comprise vertical outlet pipes communicating with groups of the vortex chambers situated one above another.

In an alternative embodiment of the new multiple hydrocyclone, the means for collection of the reject comprise inner and outer coaxial jackets defining a preferably annular space, the outer jacket having an opening for one or more vortex chambers arranged one above another. This opening can be closed by a closing means provided with one or more transparent sections in the vicinity of the reject outlets of the vortex chambers.

The new multiple hydrocyclone may also be provided with a device by which the above-mentioned closing means directly or indirectly lock the vortex chambers in their operating positions. This device may include a casing for each hydrocyclone, the underside of the casing being provided with an outlet opening through which each separate reject outlet of a vortex chamber is screened off from the reject flows from the surrounding vortex chambers.

The invention will be described further in the following with reference to the accompanying drawings, which are largely schematic and serve only by way of example.

In the drawings:

FIG. 3 is an enlarged sectional view on line III–III in FIG. 1;

FIGS. 4 and 5 are views similar to FIG. 3 but showing modifications;

FIG. 6 shows an alternative to the arrangement in FIG. 3;

FIG. 7 is a sectional view on line VII—VII of FIG. 1 in a modified embodiment;

FIG. 8 is a sectional view on line VIII—VIII of FIG. 2 in a modified embodiment;

FIG. 9 shows another arrangement for the multiple hydrocyclone according to FIG. 1;

FIG. 10 is a sectional view on line X—X of FIG. 1 in a modified embodiment;

FIG. 11 shows a detail within a section XI in FIG. 10 on a larger scale;

Figure 1:
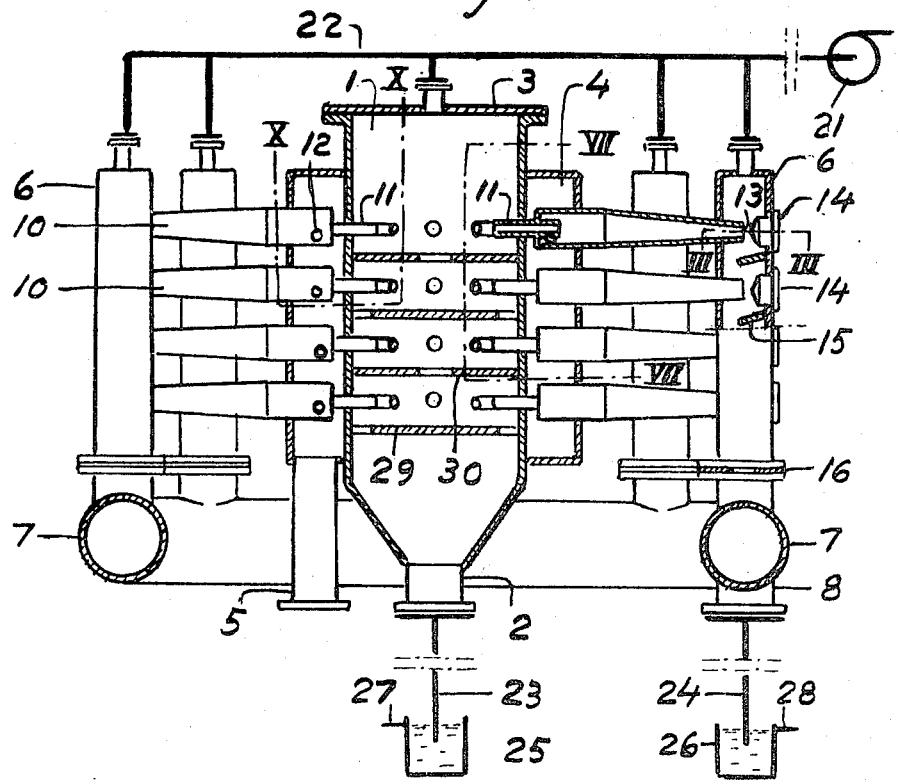
FIG. 1 is a side elevational view, partly in section, of one embodiment of the new multiple hydrocyclone.
Figure 2:
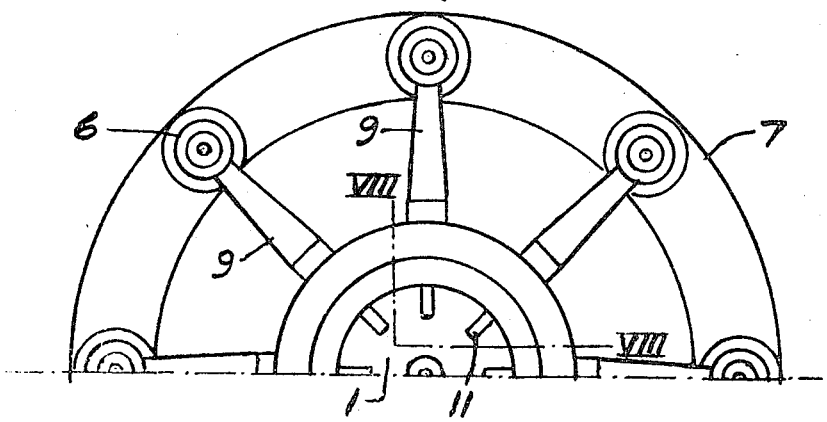
FIG. 2 is a plan view of one-half of the multiple hydrocyclone shown in FIG. 1, with the cover removed.

The multiple hydrocyclone according to FIGS. 1 and 2 comprises a central accept chamber 1 with an outlet 2 for accept and a top cover 3, an inject chamber 4 with an inlet 5 for inject, and outlet pipes 6 for reject. These outlet pipes are distributed around the central accept chamber 1 and communicate with a collection pipe 7 with an outlet 8 for reject. Distributed around the central chamber are groups 9 of vortex chambers 10 arranged one above another. The vortex chambers, which are horizontal, have their accept outlets 11 extending radially into the accept chamber 1. The inject chamber 4 contains the inject inlets 12 of the vortex chambers 10. Within each group 9, each vortex chamber 10 projects its reject end into a vertical outlet pipe 6 for reject in such a manner that the reject outlet is directed towards a door in the pipe in the form of a stopper 14. The stopper 14 is provided with a transparent section 14a, as shown in FIG. 3. Between the stoppers 14, which are situated one above another, there may be a threshold 15; and in the connection between the pipe 6 and the collection pipe 7 there may be a flow meter device which appears as a measuring flange 16.

In the operation of the multiple hydrocyclone, the suspension is conveyed under pressure through the inlet 5 and is distributed in the injection chamber 4 through the injection inlets 12 to the different vortex chambers 10. There the suspension is separated into an accept, which flows through the accept outlets 11, the accept chamber 1 and leaves the hydrocyclone through accept outlet 2, and a reject which flows through the reject outlets 13, the outlet pipes 6 for reject, the measuring flanges 16 and the collection pipe 7 and which leaves through the reject outlet 8. Through the transparent sections 14a in the stoppers 14, the reject in the outlets 13 can be sensed. The flow of reject from each group 9 of vortex chambers 10 can be controlled with the measuring flange 16. The outlets 2 and 8 can both be directly connected to the suction side of a pump (not shown) which forwards the discharging accept and reject respectively.

FIG. 3 shows how each reject outlet 13 leads to an outlet pipe 6. In the pipe 6 there is a stopper 14 which has a transparent section 14a. Between the stoppers 14, which are situated one above another, there are thresholds 15. The inset 14a is provided with an impingement plate 18 directed towards the reject outlet 13, which plate tapers conically towards the center of the outlet. The impingement plate can also be flat, as shown at 18b in FIG. 5. The reject chamber effect, known per se, will still be obtained. This means that the flow directed towards the impingement plate is spread in all radial directions, with the result that the width of the reject outlet can be increased to a considerable degree. Thus, the risk of stoppage of the reject outlet will be decreased without any risk of resucking reject into the vortex chamber.

In FIGS. 4 and 5 are shown outlet pipes 6a and 6b which are formed to provide the impingement plates 18a and 18b, respectively. These outlet pipes are made up entirely of a transparent material. Of course, it is also possible to make only parts of the outlet pipes of a transparent material.

In FIG. 6 there is shown an alternative embodiment of a connection between the reject outlet 13 and the outlet pipe 6 for reject adjacent to it. Outside the reject outlet there is a reject chamber of a kind known per se having a stopper 14b with an impingement plate 18. The outlet of the reject chamber leads to the outlet pipe 6 by way of a part of a tube 20 of transparent material, through which a break in the reject flow from the reject outlets may be discovered so that the reject outlet 13 may be cleaned when the stopper 14b has been removed.

The vortex chambers 10 as shown in FIGS. 1 and 2 are directed horizontally and radially toward the central axis of the accept chamber 1; but they can extend in different directions, for example, obliquely upwards according to FIG. 7 or tangentially towards the accept chamber 1 according to FIG. 8. Of course, a combination of these directions is possible. An arrangement according to FIG. 7 provides a decreased breadth but an increased height of the multiple hydrocyclone and may be suitable if the floor space is limited. In that embodiment, it is preferable to connect the reject outlet 13 to the outlet pipes 6 according to FIG. 6, which arrangement is independent of the directions of these units. However, the arrangement according to FIG. 8 provides turbulence of the accept in the accept chamber.

If the suspension contains relatively large quantities of gas in a dissolved or a free state, it is often desirable to remove the gas during the separation process; and the multiple hydrocyclone according to FIG. 1 is provided with means for this purpose. A vacuum pump 21 is connected to the upper parts of the accept chamber 1 as well as each of the outlet pipes 6 for reject, by means of a pipe system 22. The outlets 2 and 8 for accept and reject, respectively, are connected to two barometric descending pipes 23 and 24 leading to vessels 25 and 26, respectively, these vessels being under atmospheric pressure and having overflows 27 and 28, respectively. The barometric descending pipes have such a length that, under the vacuum maintained by means of the vacuum pump, the level of suspension in the accept and reject chambers in the multiple hydrocyclone is kept under the level of the lowest vortex chambers.

During operation in the above-described manner, the accept will flow from the accept outlets 11 to the free space in the accept chamber 1 under a pressure drop. In the accept chamber the accept will be atomized under expansion and gives off the gas, which is sucked away by means of the pipe system 22. In the outlet pipes 6 the reject is subjected to a similar degasing process. In order to facilitate the degasing process in the accept chamber 1, this chamber is provided (in a manner known per se) with intermediate partitions 29 and 30 towards which the accept repeatedly falls and is spread out in thin layers. In the illustrated example, these partitions are provided with alternately peripheral and central holes. Other usual alternatives of such systems of partitions may include rotating spreading disks. An oblique direction of the accept outlets 11 according to FIGS. 7 and 8 can also contribute to prolong the duration of stay for the accept falling through the chamber, that is, the available time for degasing. The vortex chambers do not need to be oblique in the same way, as the outlets within the chamber can be bent in the desired direction.

With these arrangements, the whole separation plant must be placed on a high level over the outlet vessels 25 and 26. This can sometimes be a disadvantage, which can be eliminated with a degasing arrangement according to FIG. 9. The accept chamber 1 here communicates with a second overlying accept chamber or degasing chamber 31 by way of its outlet 2 for accept, located in the top cover 3 and an ascending pipe 32. The degasing chamber has a bottom outlet 2a for accept which is connected to the descending pipe 23, the vessel 25 and the overflow 27 (FIG. 1) and is connected to the vacuum pump 21 by way of the network of pipes 22. The outlet pipes 6 are not in connection with the vacuum pump.

In the latter case the separation unit operates as previously described, with the exception that the accept from the accept chamber 1, under the influence of the pressure in this chamber and the prevailing vacuum in the degasing chamber, is transferred by means of the ascending pipe 23 under a pressure drop to the degasing chamber 31 where it is degased while it falls through this chamber in which the cascade-producing intermediate partitions 29 and 30 are situated instead of in the accept chamber (FIG. 1). With this arrangement, the degasing unit may be placed on a selected level under the degasing unit, if only the fact is considered that the pressure in the accept chamber and in other parts of the multiple hydrocyclone will be higher as the chosen level is lowered. The feeding pressure for the suspension must then be chosen.

Another arrangement for degasing when the multiple hydrocyclone is driven filled with suspension, in the previously described manner, is illustrated in FIGS. 10 and 11 where the gas is sucked away from the liquid free core of gas which is formed in each of the vortex chambers by means of a suction pipe 33 extending into the accept outlet. In each group of vertically spaced vortex chambers, these suction pipes are connected to the common pipe 34 in the accept chamber, which is connected to the vacuum pump 21 (FIG. 1). The suction pipes 33 are centered in the accept outlet by means of a guide 35 (FIG. 11).

Figure 12:
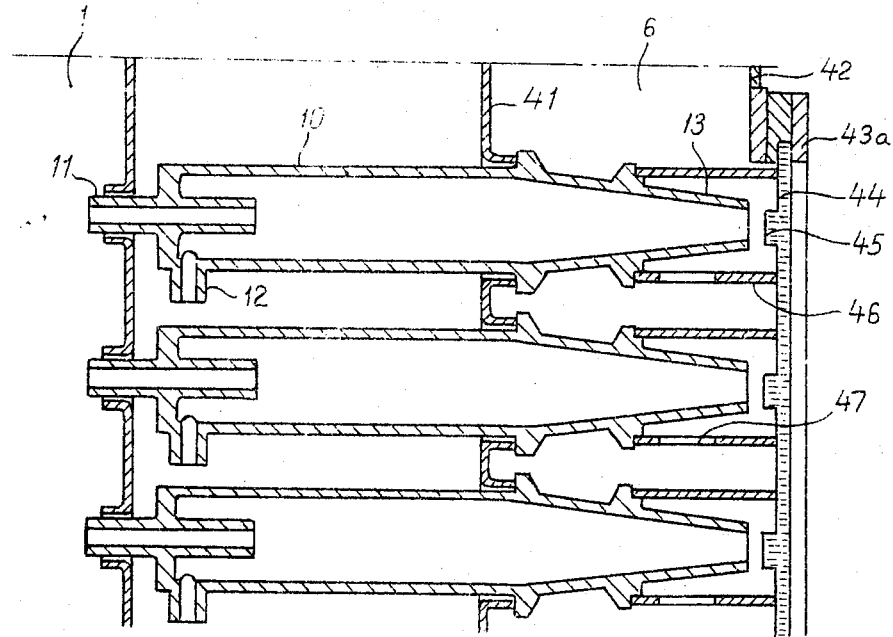
FIG. 12 is a vertical sectional view of a part of an embodiment of a multiple hydrocyclone according to the invention.

The multiple hydrocyclone according to FIG. 12 comprises a number of vortex chambers 10, which are arranged so that their inject inlets 12 are situated outside and their accept outlets 11 project into an accept chamber 1. The reject flow from the reject outlets 13 is collected in at space between two coaxial jackets 41 and 42. Outside the reject outlets there is an opening common to several vortex chambers, which is closed by means of a closing device 43 with a transparent section 44, through which several reject outlets can be observed. The transparent section outside each reject outlet is provided with impingement plates 45 for the flow of reject. In order to vary the reject flow and to fix the position of each vortex chamber, there is loose guide case 46 which is fastened on a shoulder on the vortex chamber 10. The flow of reject discharges through the opening 47.

Figure 13:
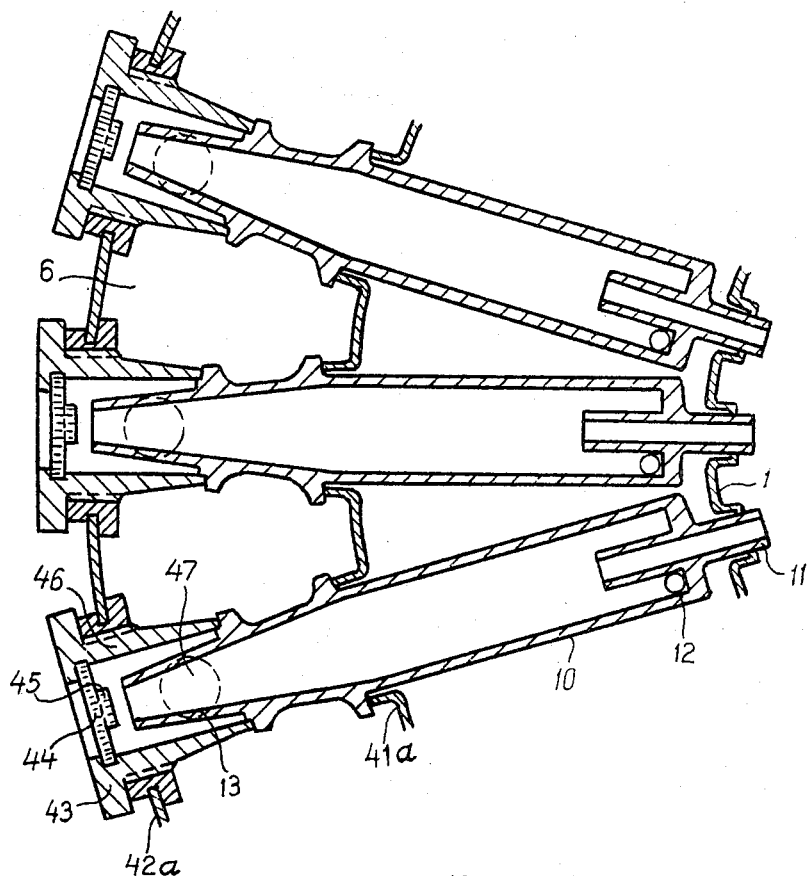
FIG. 13 shows a horizontal section view of a sector of another embodiment of a multiple hydrocyclone according to the invention.

The multiple hydrocyclone according to FIG. 13 is constructed in a similar way. It comprises a number of vortex chambers 10 each having its inject inlet 12 and accept outlet 11 turned towards an accept chamber 1, the accept outlet 11 projecting into the accept chamber 1. The reject outlets 13 of the vortex chambers lead to collecting means 6 comprising an annular space between two coaxial jackets 41a and 42a. In the outer jacket 42a there is an opening through which the reject outlet may be cleaned if it is stopped up. The opening may be made so large that the whole vortex chamber can be removed therethrough and replaced with a new one, if any damage should occur to the same. This opening may be closed by means of a fastening ring 43 which is screwed onto the outer jacket by means of a sleeve with an internal thread, which may be made of plastic or elastic material. The fastened ring 43 is provided with a transparent section 44, through which the reject flow from the reject outlet 13 can be observed, and with an impingement plate 45. The fastening ring is also provided with a cylindrical part 46 which engages with the vortex chamber and locks the same in its position. This cylindrical part has an opening 47 through which the reject flow is led into the collecting means, whereby the flow from the other reject outlets is not disturbed.

According to the invention, the reject flow from each vortex chamber can be observed during operation, and should a stoppage of the reject outlet occur, the outlet can very easily be cleaned. A damaged vortex chamber can also very easily be replaced.

With the guide casings used in the embodiments according to FIG. 12 and FIG. 13, the positions of the vortex chambers are determined and also the reject flow from each separate vortex chamber is screened off from disturbances from the surrounding vortex chambers. As a result, the reject flows from the respective vortex chambers will be of equal magnitude.

The multiple hydrocyclone can be provided in a known manner with radial intermediate walls and divided into sections, which can be shut off or coupled up according to the desired capacity.

Many separate details may be modified in many ways within the scope of the invention with the aid of the illustrated and described embodiments. For example, the cross-section of the accept chamber can be polygonal instead of circular. The vortex chambers can be cylindrical instead of conical. The inject chamber surrounding the inject inlet of the vortex chambers can be replaced by a system of pipes connected to the separate inlets in a number of ways. The outlet pipes 6 for reject can be provided with windows in other places than in the stoppers 14.

We claim:

1. A multiple hydrocyclone comprising a plurality of hydrocyclones each forming an elongated vortex chamber having an accept end provided with an inject inlet and an axial accept outlet, each chamber also having an opposed reject end provided with an axial reject outlet, a central vessel around which said hydrocyclones are distributed in groups one above another and which forms an accept chamber common to and communicating with the vortex chambers by way of their accept outlets, and means at the reject ends of the vortex chambers for collecting the reject from said reject outlets, said collecting means including means in the vicinity of said reject outlets for enabling detection of a change in the reject flow.

2. A multiple hydrocyclone according to claim 1, in which said detection means include a transparent section.

3. A multiple hydrocyclone according to claim 1, in which said detection means include a transparent section coaxial with each reject outlet.

4. A multiple hydrocyclone according to claim 1, in which said collecting means include include inner and outer jackets coaxial with said accept chamber and defining a collection space, said outer jacket having an opening for at least one of said vortex chambers, the collecting means also including means for closing said opening and provided with at least one transparent section in the vicinity of the reject outlet of a vortex chamber.

5. A multiple hydrocyclone according to claim 4, comprising also a device by which the closing means lock the vortex chambers in position.

6. A multiple hydrocyclone according to claim 4, comprising also a device by which the closing means lock the vortex chambers in position, said device comprising a casing for each hydrocyclone, said casing having at its under side an outlet opening and being operable to screen off the reject outlet of the corresponding vortex chamber from the reject flows from the surrounding vortex chambers.

7. A multiple hydrocyclone according to claim 1, in which said collecting means include a door which can be opened in the vicinity of a reject outlet and through which door at least one vortex chamber can be cleaned.

8. A multiple hydrocyclone according to claim 7, in which said door carries said detection means.

9. A multiple hydrocyclone according to claim 2, in which said transparent section has an impingement plate coaxial with a reject outlet.

10. A multiple hydrocyclone according to claim 1, in which said collecting means include a plurality of vertical pipes each communicating with vortex chambers at different levels by ways of their reject outlets.

11. A multiple hydrocyclone according to claim 10, comprising also vertically spaced transverse threholds located in each pipe between adjacent reject outlets.

12. A multiple hydrocyclone according to claim 10, comprising also vertically spaced transverse thresholds located in each pipe between adjacent reject outlets, a common outlet chamber connected to said outlet pipes and having an outlet for reject, and a flow metering device in said last outlet.

13. A multile hydrocyclone according to claim 1, in which said accept outlets of the vortex chambers project through the side wall of the accept chamber.

14. A multiple hydrocyclone according to claim 13, in which said accept chamber is generally circular in cross-section, said accept outlets leading generally radially into the accept chamber.

15. A multiple hydrocyclone according to claim 13, in which said accept chamber is generally circular in cross-section, each of said accept outlets leading into the accept chamber at an angle substantially divergent from a radial direction.

16. A multiple hydrocyclone according to claim 1, comprising also an injection chamber of annular cross-section surrounding said accept chamber and common to the vortex chambers, said injection chamber having an inlet and containing said inject inlets of the vortex chambers.

17. A multiple hydrocyclone according to claim 1, comprising also suction means for accept and reject, respectively, connected to bottom outlets of the accept chamber and said collecting means, and gas suction means connected to the upper portions of said accept chamber and collecting means.

18. A multiple hydrocyclone according to claim 1, comprising also suction pipes projecting centrally into the accept outlets extending into the accept chamber.

References Cited

UNITED STATES PATENTS

Re. 25,099   12/1961   Hoffmann _____ 210—512X

JAMES L. DeCESARE, Primary Examiner

U.S. Cl. X.R.

210—512